(12) United States Patent  (10) Patent No.: US 8,584,979 B2
Allen  (45) Date of Patent: Nov. 19, 2013

(54) FOOD PROCESSOR WITH MULTIPLE PROCESSING CONTAINERS

(75) Inventor: Michael W. Allen, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 442 days.

(21) Appl. No.: 12/900,613

(22) Filed: Oct. 8, 2010

(65) Prior Publication Data
US 2012/0085851 A1 Apr. 12, 2012

(51) Int. Cl.
A47J 43/046 (2006.01)

(52) U.S. Cl.
USPC .................................... 241/282.1; 241/285.1

(58) Field of Classification Search
USPC ............... 241/92, 282.1, 282.2, 285.1, 285.2, 241/285.3
See application file for complete search history.

(56) References Cited

U.S. PATENT DOCUMENTS

| | | | |
|---|---|---|---|
| 4,153,210 A | 5/1979 | Schaeffer | |
| 4,194,697 A | 3/1980 | Lembeck | |
| 4,586,666 A | 5/1986 | Fox | |
| 4,589,599 A | 5/1986 | Williams | |
| 4,688,478 A | 8/1987 | Williams | |
| 5,018,675 A | 5/1991 | Gateaud | |
| 5,395,060 A | 3/1995 | Hackel et al. | |
| 5,921,485 A | 7/1999 | Plavcan et al. | |
| 6,112,649 A | 9/2000 | Jeong | |
| 6,986,476 B2 | 1/2006 | Unteregger | |
| 7,328,864 B2 | 2/2008 | Narai et al. | |
| 7,681,817 B2 | 3/2010 | Orent | |
| 2005/0178864 A1 | 8/2005 | Unteregger | |
| 2008/0156913 A1 | 7/2008 | Orent | |
| 2008/0163768 A1 | 7/2008 | Glucksman et al. | |
| 2008/0230639 A1 | 9/2008 | Ferraby | |

Primary Examiner — Mark Rosenbaum
(74) Attorney, Agent, or Firm — Alexander D. Raring

(57) ABSTRACT

A food processor includes a housing, a motor disposed within the housing, an output shaft extending outwardly from the housing, a first processing container, a second processing container, and a lid removably and independently attachable to either one of the first and second processing containers. The first and second processing container are each independently and removably attachable to the housing. The first processing container is configured to be at least partially removably disposed within the interior of the second processing container. The lid is attached to the first processing container and the first processing container is attached to the housing in a first operating position. The lid is attached to the second processing container and the second processing container is attached to the housing in a second operating position. A portion of the first processing container is disposed within the interior of the second processing container in a storage position.

6 Claims, 8 Drawing Sheets

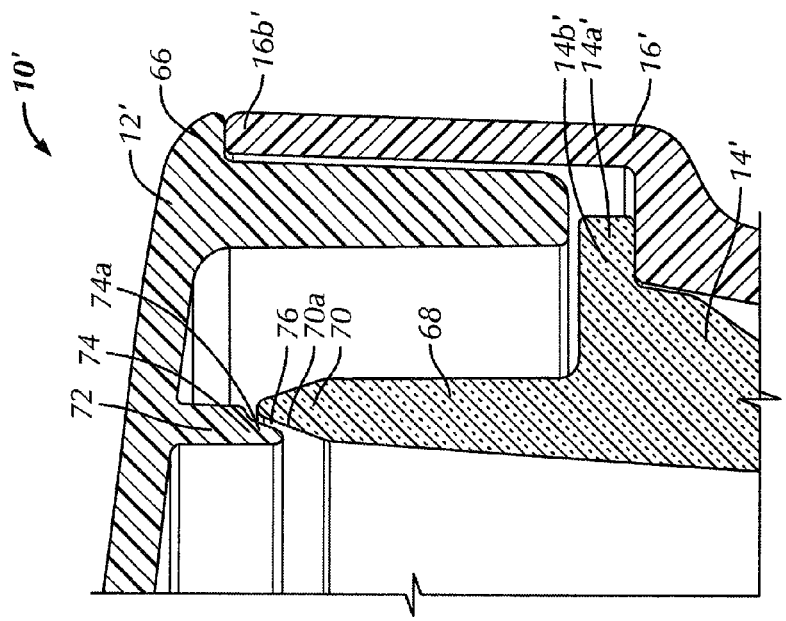
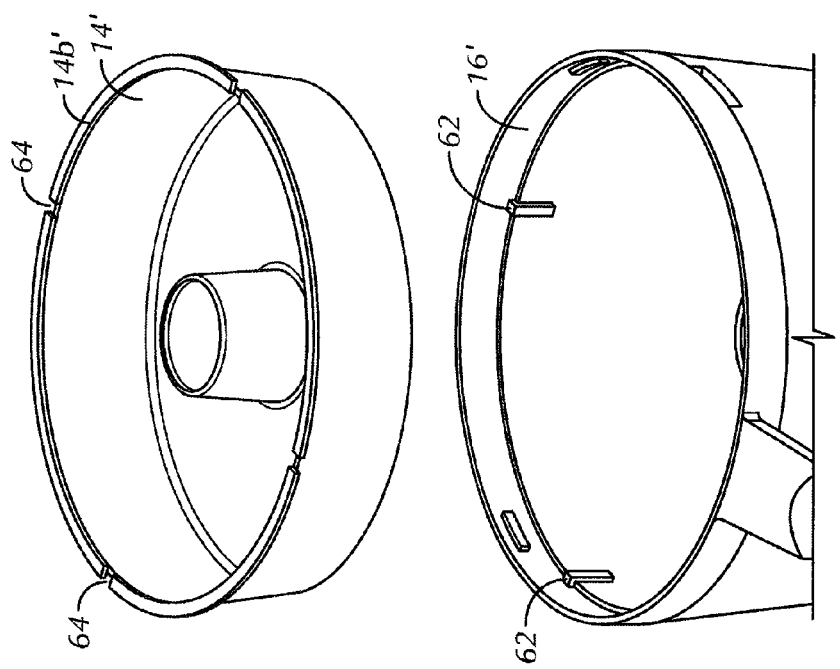

FOOD PROCESSOR WITH MULTIPLE PROCESSING CONTAINERS

BACKGROUND OF THE INVENTION

The present invention is directed to a food processor for processing foodstuff and, more particularly, to a food processor having at least two separate processing containers of varying sizes, thereby allowing for efficient processing of different quantities of foodstuff.

Food processors or other such appliances have become popular and are commonly used in residential and/or commercial kitchens or other locations where foodstuff is prepared. However, despite their popularity, food processors generally include a single bulky and large processing container which is not desirable for every use of the food processor, particularly when the user desires to process only a small quantity of foodstuff. Food processors with multiple containers of varying sizes are known in the field, but such known food processors typically require a separate lid and processing tools to be used with each container. Because such known food processors require so many processing components, they are typically costly and often prove unwieldy to store when not in use.

Therefore, it would be desirable to create a food processor equipped to efficiently process various quantities of foodstuff, and which has a structure enabling compact and efficient storage of all of the food processor components. Specifically, it would be desirable to create a food processor that is configured to utilize a common lid and processing tools with processing containers of various sizes, such that the number of processing components is kept to a minimum and the food processor, and all of its associated components can be stored together in an efficient and compact manner when not in use.

BRIEF SUMMARY OF THE INVENTION

Briefly stated, in a first preferred embodiment, the present invention is directed to a food processor including a housing, a motor disposed within the housing, an output shaft extending outwardly from the housing, a first processing container having an open end including a rim and an interior, a second processing container having an open end including a rim and an interior, and a lid removably and independently attachable to either one of the first and second processing containers. The output shaft is operably connected with the motor, such that operation of the motor causes the output shaft to rotate. The first and second processing containers are each independently and removably attachable to the housing. The first processing container is configured to be at least partially removably disposed within the interior of the second processing container. The lid is attached to the first processing container and the first processing container is attached to the housing in a first operating position of the food processor. The lid is attached to the second processing container and the second processing container is attached to the housing in a second operating position of the food processor. In a storage position of the food processor, at least a portion of the first processing container is disposed within the interior of the second processing container.

In another aspect of the first preferred embodiment, the food processor of the present invention includes an interlock mechanism operably coupled with the motor for controlling operation of the motor. The interlock mechanism includes an actuating pin and an interlock switch. The first processing container is devoid of any actuating members. The second processing container includes a longitudinally displaceable rod positioned within a channel extending along a portion of a side of the second processing container. A height of the first processing container is less than a height of the second processing container.

In a second preferred embodiment, the present invention is directed to a food processor including a housing, a motor disposed within the housing, an output shaft extending outwardly from the housing, a first processing container having an open end including a rim and an interior, a second processing container having an open end including a rim and an interior, and a lid removably and independently attachable to the second processing container. The second processing container is independently and removably attachable to the housing. The first processing container is removably disposed within the interior of the second processing container. The first processing container has a plurality of spaced apart recesses formed in the rim of the first processing container. The second processing container has a plurality of spaced apart longitudinally extending ribs proximate the open end of the second processing container. When the first processing container is disposed within the interior of the second processing container, each of the plurality of ribs of the second processing container removably engages one of the corresponding plurality of recesses of the first processing container, such that the first processing container is substantially incapable of rotation relative to the second processing container.

In a further aspect of the second preferred embodiment, the food processor of the present invention includes a housing, a motor disposed within the housing, an output shaft extending outwardly from the housing, a first processing container having an open end including a rim and an interior, a second processing container having an open end including a rim and an interior, at least one food processing tool removably engageable with the output shaft to rotate therewith, and a lid removably attachable to the second processing container. The lid has a generally centrally located protrusion having an open end, an opposing closed end and a generally tubular wall extending therebetween and outwardly from the top wall of the lid. In a first operating position, the second processing container is attached to the housing, the first processing container is disposed within the interior of the second processing container, the food processing tool removably engages the output shaft, and at least a portion of the food processing tool is received within the protrusion of the lid. In a second operating position, only the second processing container is attached to the housing and the food processing tool removably engages the output shaft.

In a further aspect of the second preferred embodiment, the food processor of the present invention includes a housing, a motor disposed within the housing, an output shaft extending outwardly from the housing, a first processing container having an open end including a rim and an interior, a second processing container having an open end including a rim and an interior, at least one food processing tool removably engageable with the output shaft to rotate therewith, and a lid removably attachable to the second processing container. The second processing container is independently and removably attachable to the housing and the first processing container is configured to be removably disposed within the interior of the second processing container. In a storage position of the food processor, the first processing container and the food processing tool are substantially entirely disposed within the interior of the second processing container, and the food processing tool is situated beneath the first processing container.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 7 is an exploded top perspective view the processing containers of the food processor shown in FIG. 6;

FIG. 8 is an enlarged cross sectional elevational view of the engagement between the lid and processing containers of the food processor shown in FIG. 6.

DETAILED DESCRIPTION OF THE INVENTION

Figure 1:
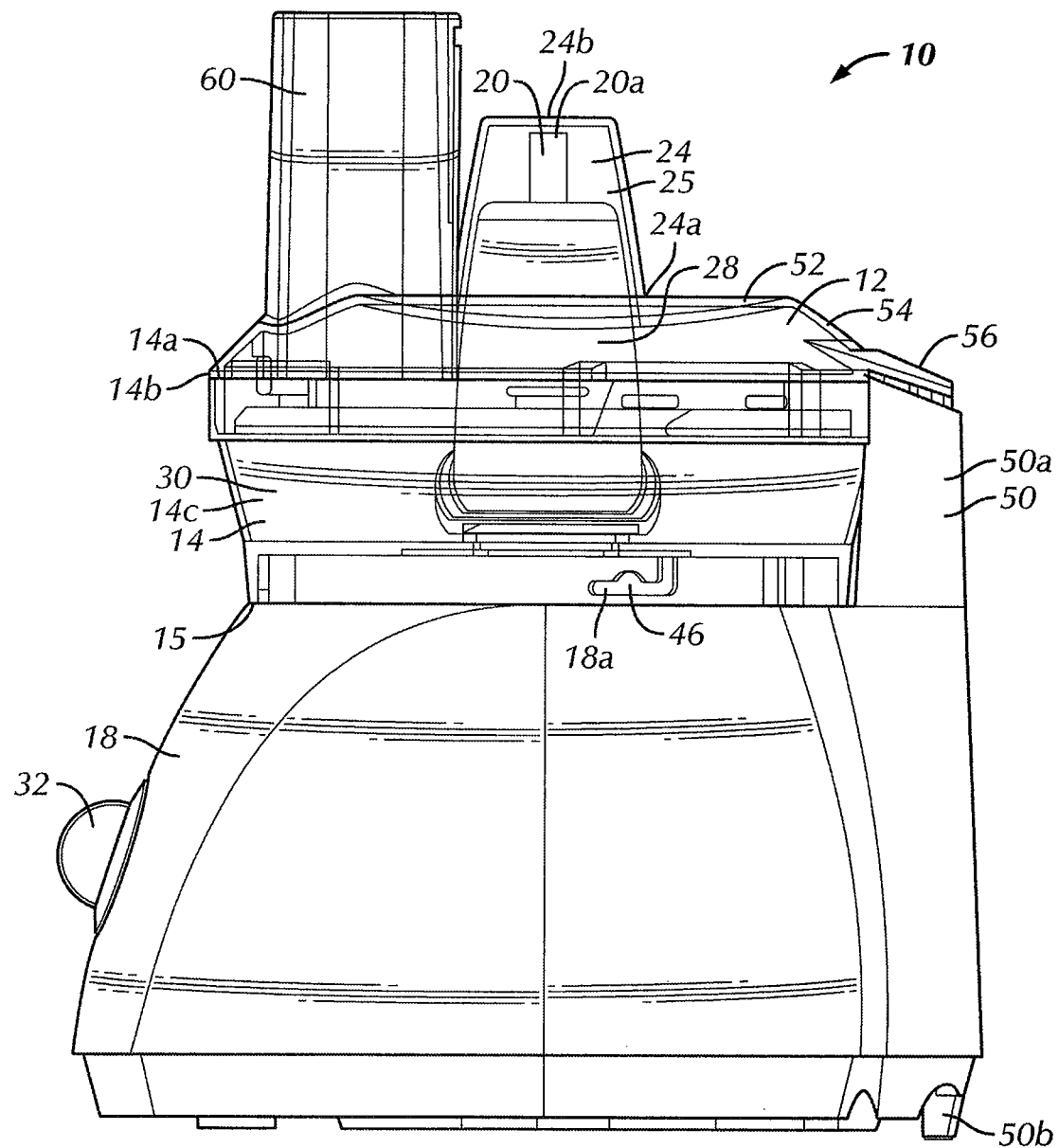
FIG. 1 is a right side elevation view of a food processor in a first operating position in accordance with a first preferred embodiment of the present invention.

Certain terminology is used in the following description for convenience only and is not limiting. The words "right," "left," "lower," and "upper" designate directions in the drawings to which reference is made. The words "inwardly" or "distally" and "outwardly" or "proximally" refer to directions toward and away from, respectively, the geometric center or orientation of the food processor and related parts thereof. The terminology includes the above-listed words, derivatives thereof and words of similar import.

Referring to the drawings in detail, wherein like numerals indicate like elements throughout, there is shown in FIGS. 1-5, a first preferred embodiment of a food processor for processing foodstuff, generally indicated 10, having a single lid 12, in accordance with the present invention. It will be understood by those skilled in the art that the lid 12 is not limited to being used in conjunction with the food processor 10 as shown in the FIG. 1, but may be used with virtually any other food processor or processing apparatus.

Figure 3:
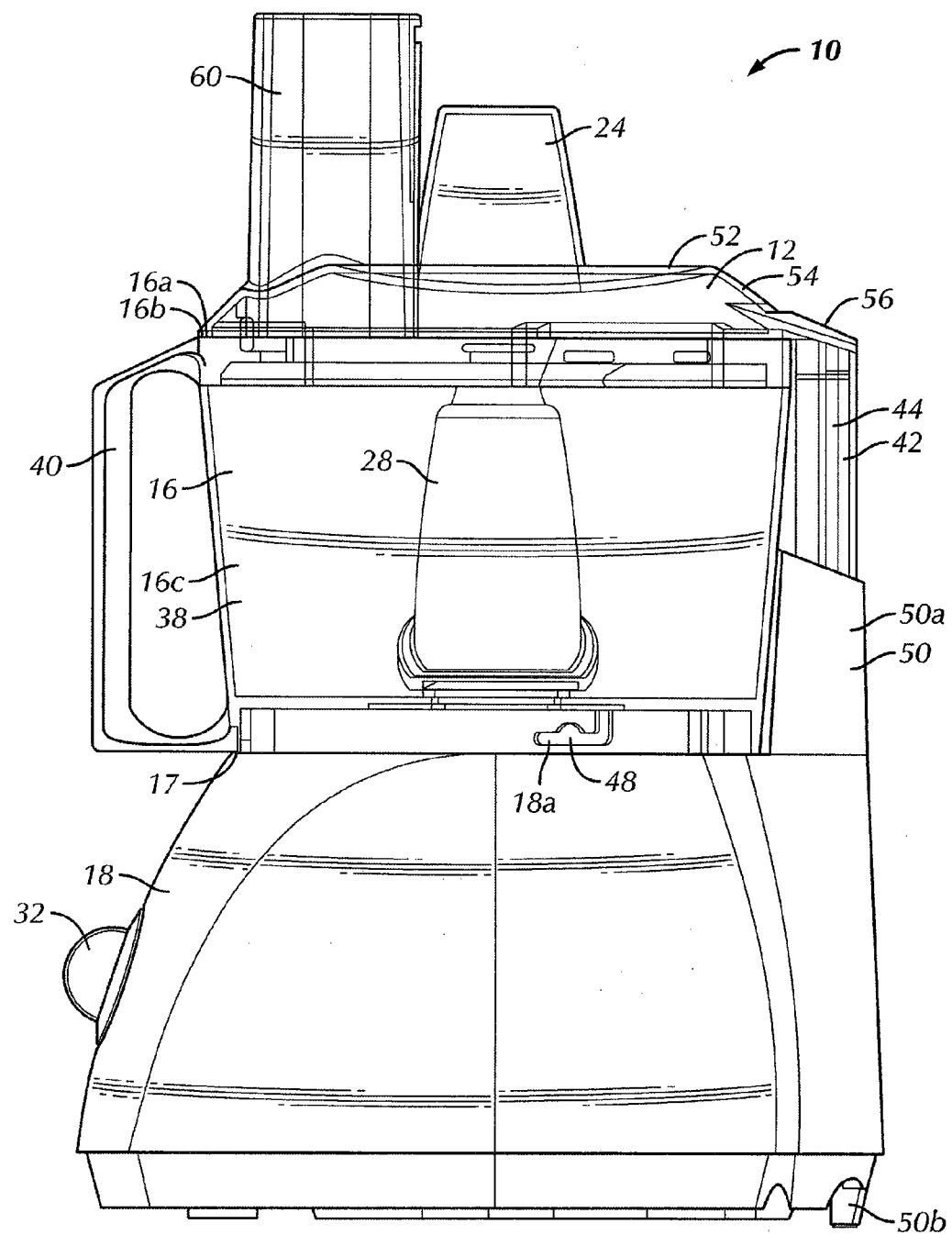
FIG. 3 is a right side elevation view of the food processor shown in FIG. 1 in a second operating position in accordance with the first preferred embodiment of the present invention.

Referring to FIGS. 1 and 3, the food processor 10 includes a base housing 18, a first processing container 14, a second processing container 16, and the lid 12. The base housing 18 has a generally a cylindrical shape and may be made of any appropriate material or construction, such as a polymer or metal. The base housing 18 houses a motor (not shown), which is preferably a conventional electric motor and is operatively connected with an output shaft 20, such that operation of the motor causes the output shaft 20 to rotate. The output shaft 20 and, more particularly, a terminal end 20a of the output shaft 20 extends generally upwardly away from the base housing 18. The outer cross sectional area of the terminal end 20a of the output shaft 20 is of a sufficient size to fit within a generally outward or upwardly extending centrally located protrusion 24 of the lid 12.

Figure 5:
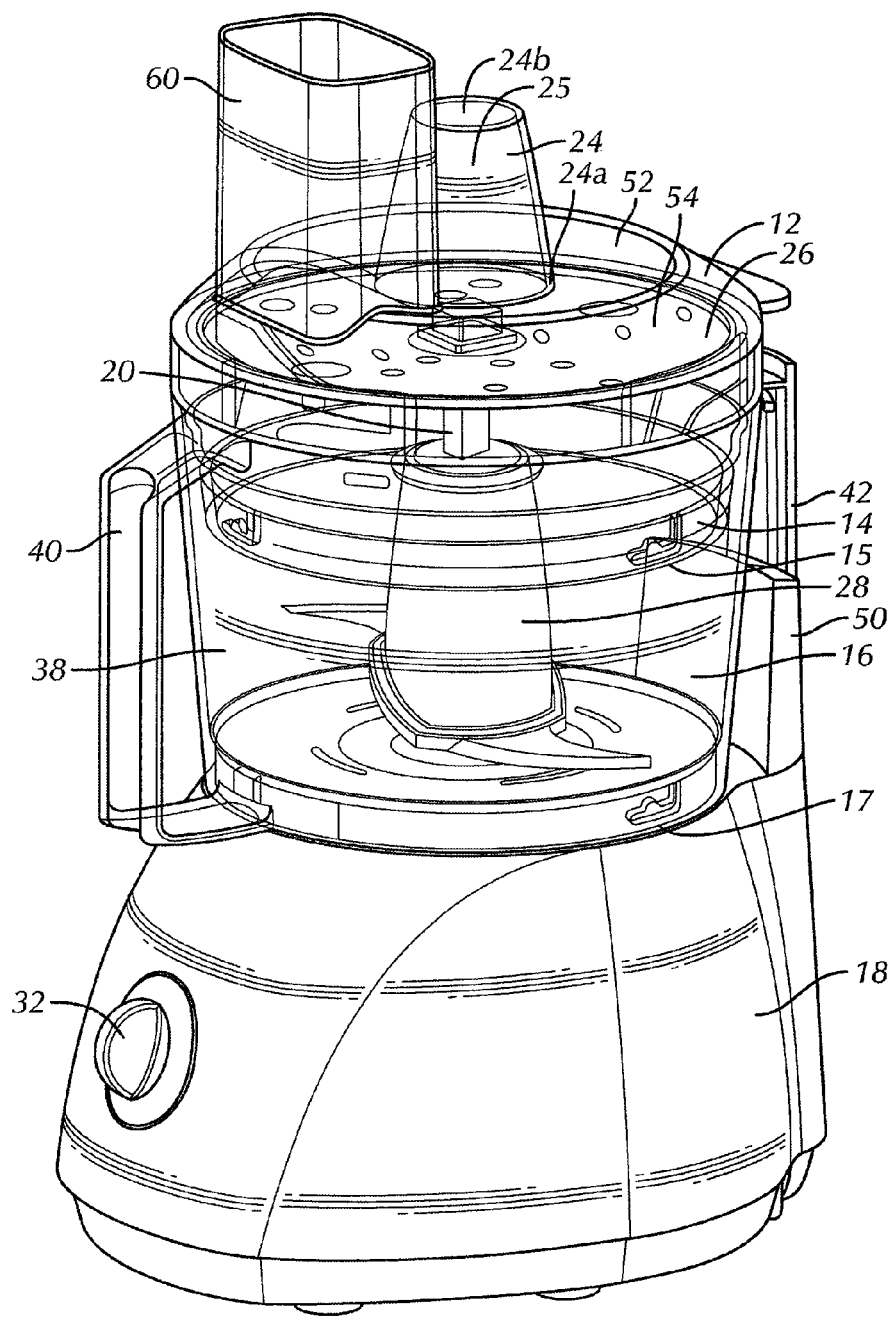
FIG. 5 is a top perspective view of the food processor shown in FIGS. 1 and 3, in a storage position.

Referring to FIG. 5, a food processing tool, such as a processing disc 26 or a rotary blade 28, may be independently used with either one of the first and second processing containers 14, 16. The food processing tool 26, 28 is preferably removably engageable with the output shaft 20. More particularly, the food processing tool 26, 28 is positioned within the first container 14 or the second container 16, such that the tool 26, 28 is engaged with the terminal end 20a of the output shaft 20. When the first processing container is being used, a securing member (not shown) located in the protrusion 24 of the lid 12, and more particularly located at the closed end 24b of the protrusion 24, provides lateral support for the output shaft 20 and helps secures the food processing tool 26, 28 vertically in place for processing of foodstuff.

Figure 2:
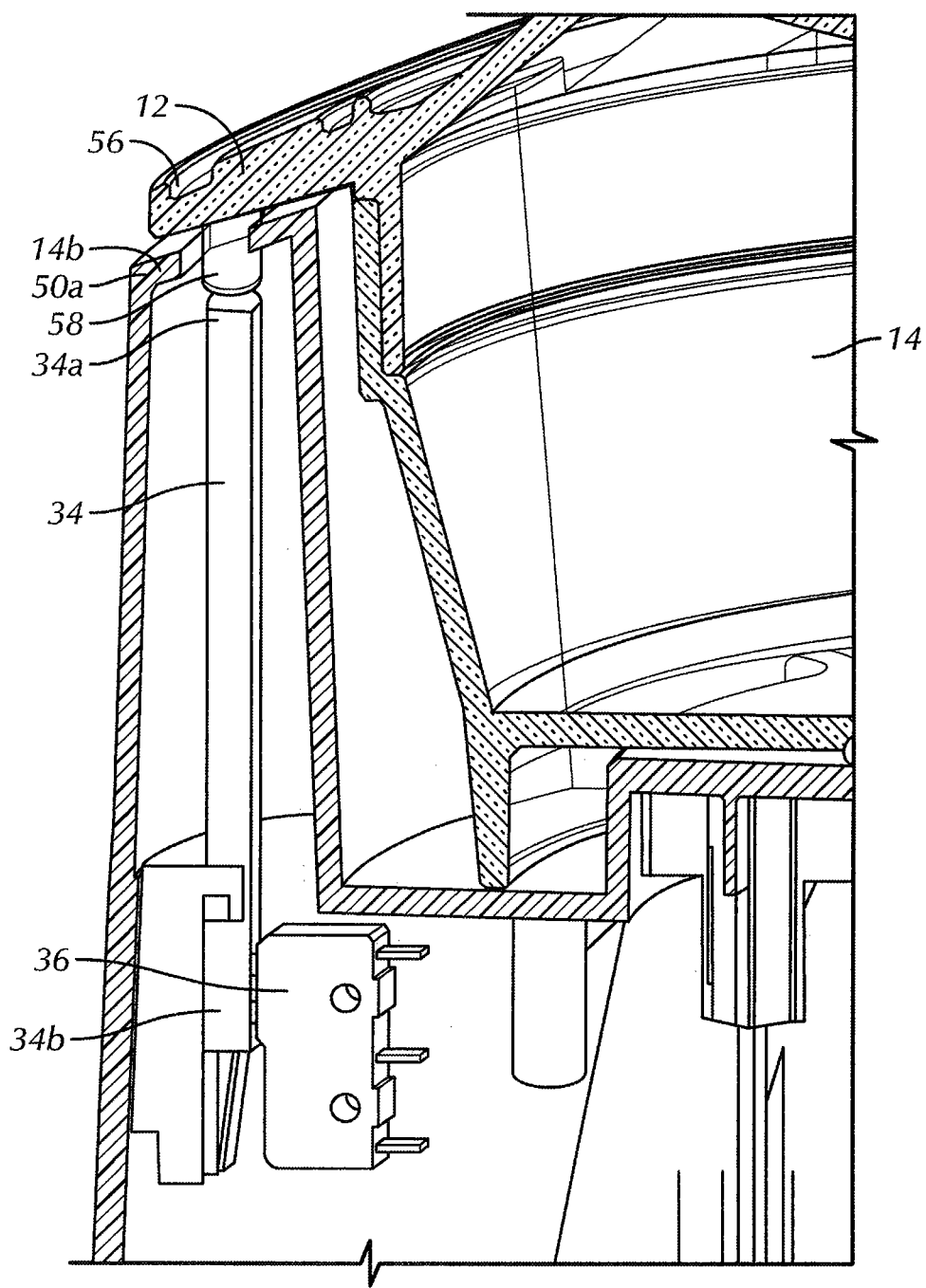
FIG. 2 is an enlarged cross sectional elevational view of the interlock mechanism of the food processor shown in FIG. 1.
Figure 4:
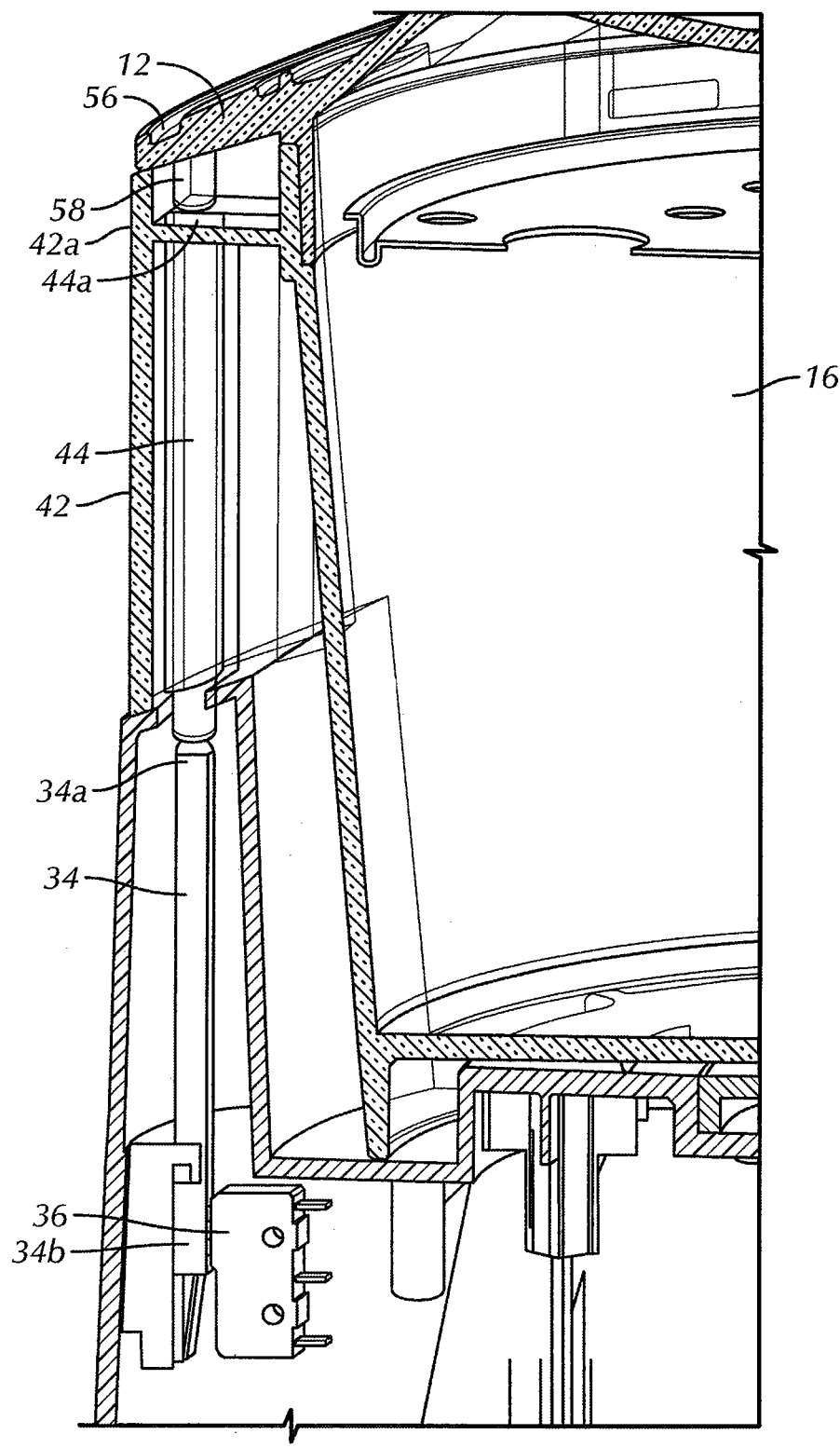
FIG. 4 is an enlarged cross sectional elevational view of the interlock mechanism of the food processor shown in FIG. 3.

The base housing 18 further includes a safety interlock, mechanism and an operating switch 32. The safety interlock mechanism is provided to prevent the food processor 10 from operating unless or until the lid 12 is firmly secured to either the first processing container 14 in the first operating position or the second processing container 16 in the second operating position. Referring to FIGS. 2 and 4, the interlock mechanism of the food processor 10 is comprised of an actuating pin 34 and an interlock switch 36, and is operative with either the first processing container 14 or the second processing container 16. More particularly, the actuating pin 34 has an upper end 34a and a lower end 34b, and the interlock switch 36 is in contact with the lower end 34b of the actuating pin 34. The interlock mechanism, specifically the interlock switch 36, is operably coupled with the motor for controlling operation of the motor. The actuating pin 34 is biased upwardly and out of engagement with the interlock switch 36. Accordingly, downward movement of the actuating pin 34 causes the interlock switch 36 to close to enable operation of the motor. Such downward movement of the actuation pin 34 occurs when the first or second processing container 14, 16 and the lid 12 are properly positioned, as described in more detail below. The operating switch 32 is electrically connected to the motor to enable a user to turn the motor on or off. It will be understood by those skilled in the art that the operating switch 32 may take any appropriate form, such as a toggle switch, a push button or a series of push buttons, a dial, a slide switch, touchpad or the like.

Referring to FIGS. 1 and 3, each of the first processing container 14 and the second processing container 16 has a generally cylindrical shape, and is independently and removably attachable to or mountable on the base housing 18. The respective upper open ends 14a, 16a of each of the first and second processing containers 14, 16 each includes a respective rim 14b, 16b. The first processing container 14 also includes a sidewall 14c, a generally circular bottom wall 15 integral with and generally perpendicular to the sidewall 14c, and an interior 30 generally defined by the sidewall 14c and the bottom wall 15.

Similarly, the second processing container 16 includes a sidewall 16c, a generally circular bottom wall 17 integral with and generally perpendicular to the sidewall 16c, and an interior 38 generally defined by the sidewall 16c and the bottom wall 17. The interior 38 of the second processing container 16 is larger, that is includes a greater volume, than the interior 30 of the first processing container 14. In addition, the second processing container 16 includes a handle 40 integrally molded to the side wall 16c and extending outwardly there-from to provide the user with a gripping surface with which to pick up, carry, and otherwise handle the second processing container 16. At a position opposite, or 180 degrees from, the handle 40, the second processing container 16 includes a channel 42 which extends generally longitudinally along a portion of the height of the second processing container 16. More particularly, the channel 42 extends along a portion of the sidewall 16c, generally parallel to the sidewall 16c and perpendicular to the bottom wall 17. A vertically or longitudinally displaceable rod 44 is positioned within the channel 42. The longitudinally displaceable rod 44 has a first relaxed position, where the rod 44 is preferably spring-biased toward an upper end 42a of the channel 42, and a second position where the rod 44 is longitudinally displaced relative to the first position.

Extending upwardly from the center of the bottom wall 15, 17 of each of the first and second processing containers 14, 16, respectively, is a respective generally cylindrical central tube (not shown) sized to accommodate the output shaft 20 extending therethrough when the first or second container 14, 16 is secured to the base housing 18. Although the first and second processing containers 14, 16 and base housing 18 are described as being generally cylindrical in shape, it will be understood by those skilled in the art that both components may be of a different shape as long as they are able to perform their generally intended functions. For example, the first and second processing containers 14, 16 and base housing 18 may be ovular in shape.

The first and second processing containers 14, 16 each has a respective plurality of protrusions 46, 48 proximate the respective bottom walls 15, 17. The protrusions 46, 48 extend inwardly from respective interior surfaces of the sidewalls 14c, 16c and slidingly engage with corresponding slots 18a formed in an exterior side wall of the base housing 18, proximate an upper end of the base 18, to independently retain either of the first and second processing containers 14, 16 on the base housing 18.

As shown in FIGS. 1 and 3, a support post 50 extends along the side of the base 18 and at least a portion of each of the first and second processing containers 14, 16. When the second processing container 16 is mounted and secured on the base 18, the support post 50 is positioned opposite, or 180 degrees from, the handle 40. At least a portion of the actuating pin 34 of the interlock mechanism is disposed within and extends generally longitudinally within the support post 50. One end of the support post 50 is optionally equipped with a supporting member in the form of a leg 50b which supports the food processor 10 and serves to keep the food processor 10 stable. It will be understood by those skilled in the art that the supporting member may be in various other forms, such as a prop, stump, post, etc.

Referring to FIGS. 1-4, the lid 12 is preferably removably and independently attachable to or mountable on either one of the first processing container 14 or the second processing container 16. More particularly, the lid 12 is removably and independently attachable to the upper open end 14a, 16a or rim 14b, 16b of either one of the first or second processing containers 14, 16, respectively, of the food processor 10. Referring to FIGS. 1 and 3, the lid 12 includes a top wall 52 and a side wall 54 which is integral with and extends generally downwardly from the top wall 52. The generally centrally located protrusion 24 of the lid 12 includes an open end 24a generally in the same plane as the top wall 52, an opposing closed end 24b, and a generally conical tubular wall 25 extending therebetween and outwardly away from the top wall 52 (see FIG. 5).

Referring to FIGS. 1-4, one end of the lid 12 is provided with a locking tang 56 and an actuating tab 58. The locking tang 56 is provided to removably engage with the support post 50 when the food processor 10 is in an assembled or operating position, as described in more detail below. A food chute 60 extends outwardly or upwardly away from top wall 52 and surrounds a corresponding opening or aperture formed in the top wall 52 at the location of the food chute 60 to allow foodstuffs to be inserted into the food chute 60 and pass through the lid 12 and into one of the first or second processing container 14, 16 for the processing of the foodstuffs.

Referring to FIGS. 1-2, in the first operating position, the first processing container 14 is attached to the base housing 18 and the lid 12 is securely attached to the first processing container 14, for example, by a plurality of corresponding protrusions and slots. In the first operating position, the output shaft 20 passes through the cylindrical central tube of the first processing container 14, and a food processing tool, such as the rotary blade 28, may then be secured to the output shaft 20. At least a portion of the rotary blade 28 is received within the protrusion 24 of the lid 12.

In the first operating position, when the first processing container 14 is properly positioned and secured to the base housing 18, the lid 12 directly engages the base housing 18. More particularly, referring to FIG. 2, in the first operating position, the locking tang 56 of the lid 12 rests on the upper end 50a of the support post 50 and the actuating tab 58 engages the upper end 34a of the actuating pin 34, causing the actuating pin 34 to be depressed to operate the interlock switch 36, such that operation of the motor is allowed. The first processing container 14 itself is devoid of any actuating members.

Referring to FIGS. 3-4, in a second operating position, the second processing container 16 is attached to the base housing 18 and the lid 12 is attached to the second processing container 16, for example, by a plurality of corresponding protrusions and slots. In the second operating position, the rotary blade 28 is substantially entirely disposed within the interior 38 of the second processing container 16. When the second processing container 16 is properly positioned and secured to the base housing 18, the lid 12 directly engages the channel 42. More particularly, referring to FIG. 4, in the second operating position, the locking tang 56 of the lid 12 rests on the upper end 42a of the channel 42, such that the actuating tab 58, the displaceable rod 44 and the actuating pin 34 are all aligned with each other. In the aligned position, the actuating tab 58 contacts or engages the upper end 44a of the displaceable rod 44, causing the rod 44 to be displaced from the first position to the second position against the spring force exerted upon it. The displaced rod 44, in turn, causes the actuating pin 34 to be depressed to operate the interlock switch 36, such that operation of the motor is enabled.

Referring to FIG. 5, when the food processor 10 is not in use, the configuration of all of the components allows for easy and compact storage of the food processor 10 and all of its associated components. Particularly, the diameters of the respective open ends 14a, 16a of the first and second processing containers 14, 16 are substantially the same, and the height of the first processing container 14 is less than a height of the second processing container 16. The first processing container 14 also has a generally tapered radial periphery, such that the diameter of the open end 14a of the first processing container 14 is larger than that of the bottom wall 15. Also, the diameter of the bottom wall 15 of the first processing container is smaller than or equal to the diameter of the bottom wall 17 of the second processing container 16.

Accordingly, the first processing container 14 may be positioned within the second processing container 16, as shown in FIG. 5.

More particularly, in the storage position, the rim 14*b* of the first processing container 14 rests on the rim 16*b* of the second processing container 16 and the bottom wall 15 of the first processing container 14 is comfortably received within the interior 38 of the second processing container 16, such that at least a portion of the first processing container 14 is disposed within the interior 38 of the second processing container 16. Additionally, as shown in FIG. 5, the rotary blade 28 may be disposed within the interior 38 of the second processing container 16, on the output shaft 20, positioned below the first processing container 14. The processing disc 26 may be disposed within the interior 30 of the first processing container 14, on the output shaft 20, positioned above the rotary blade 28.

Figure 6:
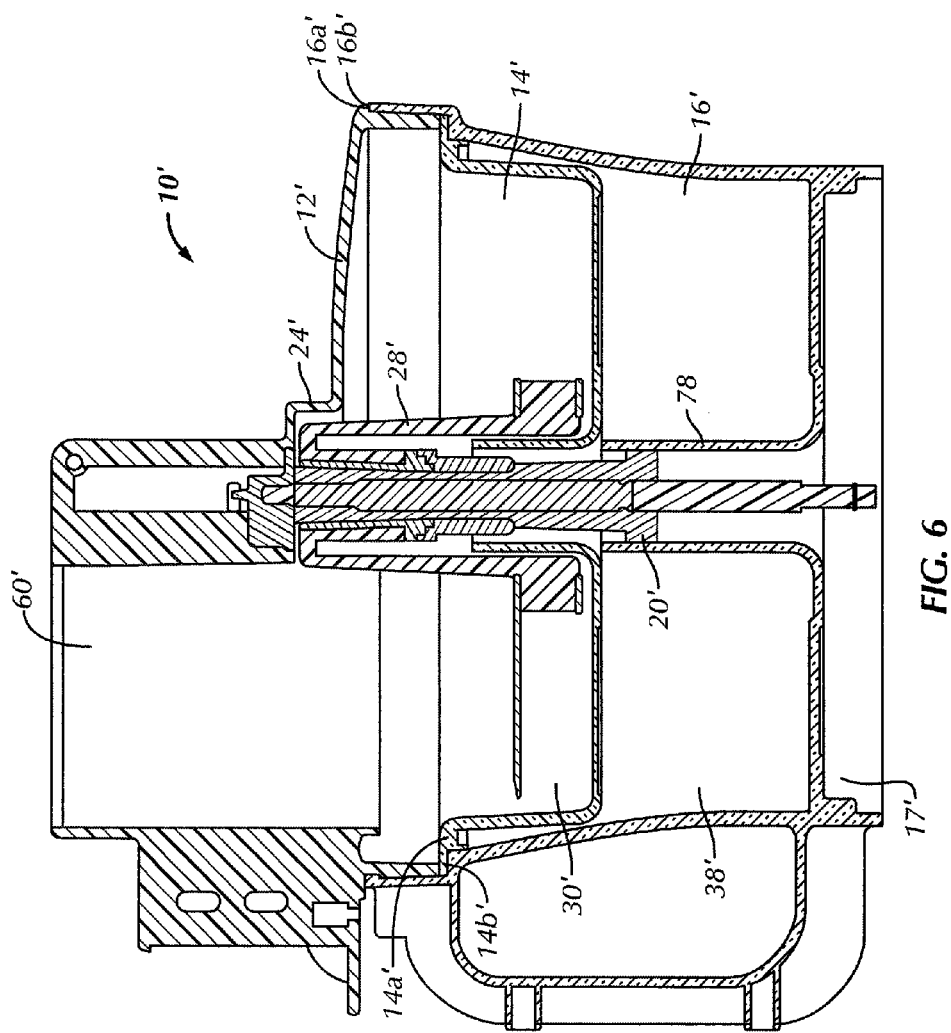
FIG. 6 is a cross sectional elevational view of a food processor in an operating position in accordance with a second preferred embodiment of the present invention.
Figure 9:
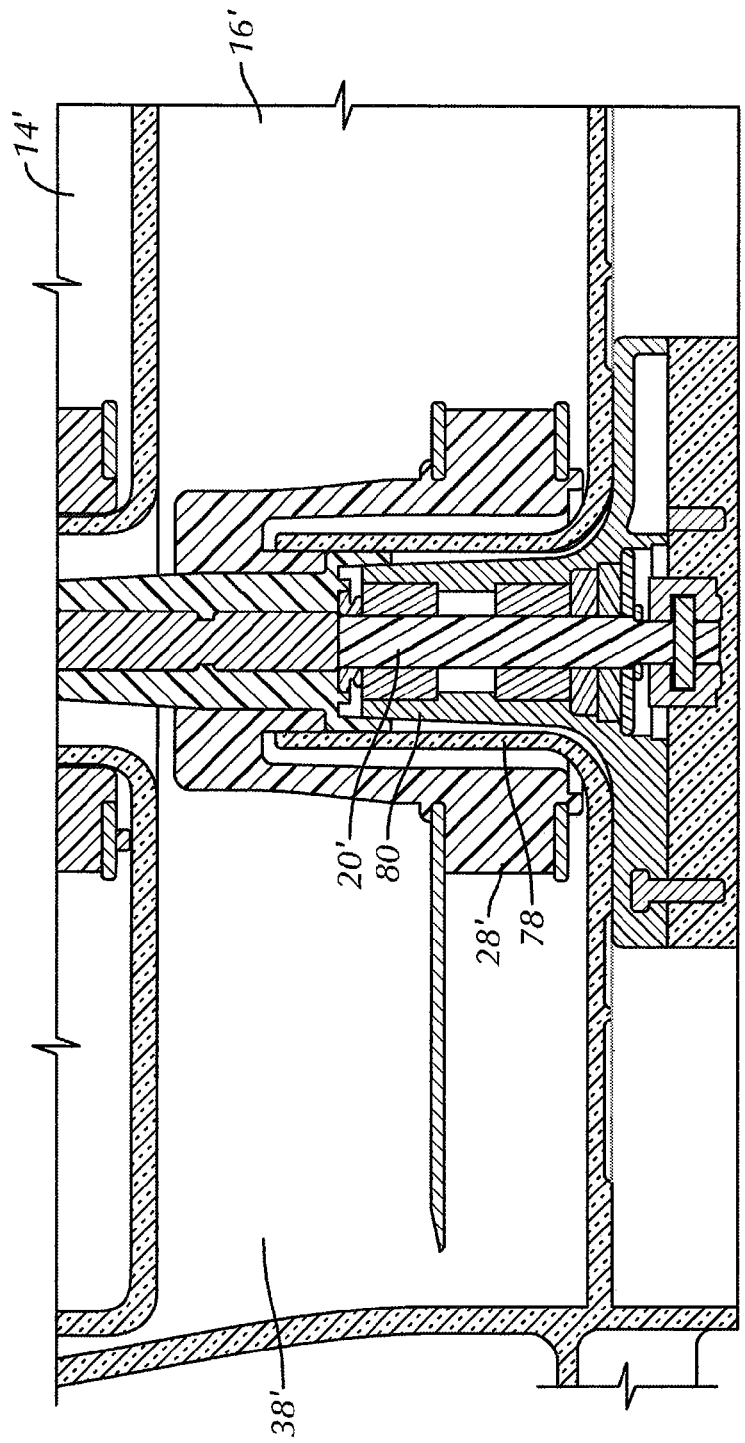
FIG. 9 is an enlarged partial cross-sectional elevational view of the food processor shown in FIG. 6, in a storage position.

Referring to FIGS. 6-9, similar to the food processor 10 of the first preferred embodiment, the food processor 10' of the second preferred embodiment includes a lid 12' with a food chute 60', a first processing container 14' with an upper open end 14*a'* including a rim 14*b'*, and a second processing container 16' with an upper open end 16*a'* including a rim 16*b'*. The height of the first processing container 14' is less than the height of the second processing container 16'. The food processor 10' of the second preferred embodiment differs from the food processor 10 of the first preferred embodiment in that only the second processing container 16' is removably and independently attachable to or mountable on the base housing, and the first processing container 14' of the second preferred embodiment cannot be used independently of the second processing container 16'. Instead, the first processing container 14' can only be utilized for processing foodstuff when disposed or nested within the second processing container 16', as shown in FIG. 6. The same lid 12' and food processing tools (i.e., rotary blade 28') can be utilized with either the second processing container 16' alone or with the first processing container 14' nested within the second processing container 16'.

Referring to FIG. 7, the interior surface of the second processing container 16' is equipped with a plurality of spaced apart longitudinally extending ribs 62 proximate the open end 16*a'*. The exterior surface of the first processing container 14' has a corresponding plurality of spaced apart recesses 64 formed in the rim 14*b'*. Accordingly, when the first processing container 14' is disposed or nested within the second processing container 16', each of the ribs 62 of the second processing container 16' removably engages a corresponding one of the recesses 64 of the first processing container 14', such that the first processing container 14' is substantially locked to the second processing container 16' and is incapable of rotation relative to the second processing container 16'.

In a first operating position of the food processor 10' of the second preferred embodiment, only the second processing container 16' is attached to the base housing, the rotary blade 28' removably engages the output shaft 20' and the lid 12' is removably attached to the second processing container 16'. In the first operating position, the rotary blade 28' is substantially entirely disposed within the interior 38' of the second processing container 16'. The engagement between the lid 12' and the second processing container 16' is best shown in FIG. 8. Specifically, an annular flange 66 formed along the circumferential periphery of the lid 12' engages the rim 16*b'* of second processing container 16', such that particles of foodstuff being processed in the second processing container 16' are prevented from escaping the interior 38' of the second processing container 16' during operation of the food processor 10'.

In a second operating position of the food processor 10', as shown in FIG. 6, the second processing container 16' is attached to the base housing, with the rotary blade 28' removably engaging the output shaft 20', the first processing container 14' removably disposed within the interior 38' of the second processing container 16', and the lid 12' removably attached to the second processing container 16'. In the second operating position, the rotary blade 28' is situated at a position spaced apart from the bottom wall 17' of the second processing container 16' and the base housing, such that at least a portion of the rotary blade 28' is received within the centrally located protrusion 24' of the lid 12'.

Referring to FIG. 8, in the second operating position of the food processor 10', the lid 12' contacts and engages the first processing container 14', as well as the second processing container 16'. The lid 12' engages the second processing container 16' as described above. The first processing container 14' includes an annular rib 68 proximate the upper open end 14*a'* of the first processing container 14'. The annular rib 68 of the first processing container 14' generally extends upwardly away from the upper open end 14*a'* and has a distal end 70 with a beveled edge 70*a*. The lid 12' includes a corresponding annular rib 72 which generally extends downwardly away from the interior of the top wall 40' of the lid 12'. The annular rib 72 of the lid 12' is spaced inwardly from the peripheral annular flange 66 of the lid 12' and has a distal end 74 with a beveled edge 74*a*. The angle of the beveled edge 70*a* of the annular rib 68 of the first processing container 14' extends in a direction generally opposite to the angle of the beveled edge 74*a* of the annular rib 72 of the lid 12'. Thus, in the second operating position, the distal end 70 of the annular rib 68 of the first processing container 14' is adjacent to the distal end 74 of the annular rib 72 of the lid 12', such that only a small clearance 76 remains between the distal ends 70, 74.

The near-engaging configuration of the annular ribs 68, 72 prevents particles of foodstuff being processed are prevented from escaping the interior 30' of the first processing container 14' during operation of the food processor 10'. Specifically, the small clearance 76 forms a so-called "torturous" path for the particles of foodstuff, thereby significantly reducing the likelihood of any particles escaping from the first processing container 14' after contacting the food processing tool.

In a storage position of the food processor 10', the first processing container 14', the second processing container 16' and the food processing tool may be stored together in a nested fashion. Specifically, referring to FIG. 9, the first processing container 14' and the rotary blade 28' are substantially entirely disposed within the interior 38' of the second processing container 16', with the rotary blade 28' being situated or positioned beneath the first processing container 14'. Such a storage configuration is possible with the food processor 10' of the second preferred embodiment because the size and position of the various components of the food processor 10' have been reduced and/or the positions of various components have been lowered as compared with conventional food processors.

For example, the cylindrical central tube 78 and the output shaft 20' of the food processor 10' have shorter lengths than similar components in conventional food processors, and a fixed plate assembly 80 of the food processor 10' is situated at a lower position relative to conventional food processors. Thus, when a food processing tool such as the rotary blade 28' is situated within the second processing container 16', the hub of the rotary blade 28' sits relatively low within the interior 38' of the second processing container 16', such that the first processing container 14' may be also be nested within the second processing container 16' and positioned above the rotary blade 28'.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A food processor for processing foodstuffs, comprising:
 a housing;
 a motor disposed within the housing;
 an output shaft extending outwardly from the housing, the output shaft operably connected with the motor, such that operation of the motor causes the output shaft to rotate;
 a first processing container having an open end including a rim and an interior, the first processing container being independently and removably attachable to the housing; and
 a second processing container having an open end including a rim and an interior, the second processing container being independently and removably attachable to the housing, the first processing container being configured to be at least partially removably disposed within the interior of the second processing container, and
 a lid removably, independently, and directly attachable to either one of the first and second processing containers,
 wherein the lid is directly attached to the first processing container and the first processing container is directly attached to the housing in a first operating position of the food processor,
 wherein the lid is directly attached to the second processing container and the second processing container is directly attached to the housing in a second operating position of the food processor, and
 wherein at least a portion of the first processing container is disposed within the interior of the second processing container in a storage position of the food processor.

2. The food processor of claim 1, wherein the first and second processing containers are generally cylindrical and a diameter of the open end of the first processing container is substantially the same as a diameter of the open end of the second processing container, such that the rim of the first processing container rests on the rim of the second processing container in the storage position of the food processor.

3. The food processor of claim 1, wherein a height of the first processing container is less than a height of the second processing container.

4. The food processor of claim 1, wherein the lid includes a food chute extending outwardly from a top wall, the lid having a corresponding opening therethrough at the location of the food chute to allow foodstuffs to be inserted into the food chute and pass through the lid and into one of the first and second processing containers in order to process the foodstuffs.

5. The food processor of claim 1 further comprising at least one food processing tool removably engageable with the output shaft to rotate therewith and configured to be independently used with either one of the first and second processing containers.

6. The food processor of claim 5, wherein the lid includes a generally centrally located protrusion having an open end, an opposing closed end and a generally tubular wall extending therebetween and outwardly from the top wall, at least a portion of the food processing tool being received within the protrusion in the first position of the food processor.

\* \* \* \* \*